US008831865B2

(12) United States Patent
Sengoku et al.

(10) Patent No.: US 8,831,865 B2
(45) Date of Patent: Sep. 9, 2014

(54) FUEL EFFICIENCY INFORMATION MANAGEMENT SERVER, FUEL EFFICIENCY INFORMATION MANAGEMENT SYSTEM, AND FUEL EFFICIENCY INFORMATION MANAGEMENT METHOD

(75) Inventors: Koji Sengoku, Tokyo (JP); Yuichiro Ishido, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 223 days.

(21) Appl. No.: 13/500,865

(22) PCT Filed: Jun. 25, 2010

(86) PCT No.: PCT/JP2010/060862
§ 371 (c)(1),
(2), (4) Date: Apr. 6, 2012

(87) PCT Pub. No.: WO2011/043111
PCT Pub. Date: Apr. 14, 2011

(65) Prior Publication Data
US 2012/0197517 A1    Aug. 2, 2012

(30) Foreign Application Priority Data

Oct. 6, 2009 (JP) .................................. 2009-232656

(51) Int. Cl.
*G06F 19/00*  (2011.01)
*G06G 7/76*  (2006.01)
*G06F 7/00*  (2006.01)
*G07C 5/00*  (2006.01)

(52) U.S. Cl.
CPC ...................................... *G07C 5/008* (2013.01)
USPC .................. 701/123; 701/1; 701/70; 701/99; 701/101; 701/29.1

(58) Field of Classification Search
CPC ...... G01C 21/3469; G07C 5/00; G07C 5/008; G07C 5/0816
USPC .................................. 701/123, 1, 70, 99, 101
See application file for complete search history.

(56) References Cited

U.S. PATENT DOCUMENTS

2007/0027593 A1*  2/2007  Shah et al. .................. 701/30
2011/0251782 A1*  10/2011  Perkins et al. .............. 701/123

(Continued)

FOREIGN PATENT DOCUMENTS

JP    2002-296040    10/2002
JP    2002-304563    10/2002

(Continued)

OTHER PUBLICATIONS

International Search Report for Application No. PCT/JP2010/060862, pp. 1-4, dated Aug. 3, 2010.

*Primary Examiner* — Khoi Tran
*Assistant Examiner* — Robert Nguyen
(74) *Attorney, Agent, or Firm* — Nelson Mullins Riley & Scarborough LLP; Anthony A. Laurentano

(57) ABSTRACT

Provided are a server, a system and a method by which a utility value of information relating to fuel efficiency of a vehicle can be improved. A fuel efficiency information management server (100) functions so that a driver of each vehicle or a third party is informed of a ranking corresponding to the fuel efficiency level of each vehicle, together with a travel state factor of each vehicle when the fuel efficiency is achieved, through a system of eco-information.

4 Claims, 4 Drawing Sheets

(56) References Cited

U.S. PATENT DOCUMENTS

| | | | |
|---|---|---|---|
| 2012/0065834 A1* | 3/2012 | Senart et al. | 701/31.4 |
| 2012/0109510 A1* | 5/2012 | Ota et al. | 701/400 |
| 2012/0139922 A1* | 6/2012 | Heo | 345/440 |
| 2012/0143484 A1* | 6/2012 | Sawada | 701/123 |
| 2013/0173136 A1* | 7/2013 | Kim et al. | 701/101 |

FOREIGN PATENT DOCUMENTS

| | | |
|---|---|---|
| JP | 2003-208696 | 7/2003 |
| JP | 2003-331380 | 11/2003 |
| JP | 2004-145727 | 5/2004 |
| JP | 2006-48541 | 2/2006 |
| JP | 2007-248434 | 9/2007 |
| WO | 2007/138744 A1 | 12/2007 |

* cited by examiner

FUEL EFFICIENCY INFORMATION MANAGEMENT SERVER, FUEL EFFICIENCY INFORMATION MANAGEMENT SYSTEM, AND FUEL EFFICIENCY INFORMATION MANAGEMENT METHOD

RELATED APPLICATIONS

This application is a 35 U.S.C. 371 national stage filing of International Application No. PCT/JP2010/060862, filed Jun. 25, 2010, which claims priority to Japanese Patent Application No. 2009-232656 filed on Oct. 6, 2009 in Japan. The contents of the aforementioned applications are hereby incorporated by reference.

TECHNICAL FIELD

The present invention relates to a server configured to manage information relating to fuel efficiency of a vehicle and a system with the server included as a component.

BACKGROUND ART

Hitherto, there has been disclosed a technical method configured to collect and store a travel information for each of a plurality of vehicles, and display a fuel efficiency information or the like in the form of a text-based table to each driver (refer to Japanese Patent Laid-open No. 2003-331380).

SUMMARY OF THE INVENTION

Problems to be Solved by the Invention

However, since the fuel efficiency of a vehicle may fluctuate on several factors, the cause and effect relationship between the fuel efficiency and the several factors is ambiguous; therefore, it is possible to deteriorate a utility value of information relating to the fuel efficiency viewed by a viewer.

The present invention has been accomplished in view of the aforementioned problems, and it is therefore an object of the present invention to provide a server and the like by which the utility value of information relating to the fuel efficiency of a vehicle can be improved.

Means for Solving the Problems

To attain an object described above, a fuel efficiency information management server of the present invention comprises: a first support calculation processing element configured to recognize a fuel efficiency and a travel state factor serving as a variation factor of the fuel efficiency in a predefined period for each of a plurality of vehicles; and a second support calculation processing element configured to transmit an eco-information of each vehicle containing a ranking corresponding to the level of the fuel efficiency and the travel state factor recognized by the first support calculation processing element to a predefined terminal device.

To attain an object described above, a fuel efficiency information management system of the present invention comprises a fuel efficiency information management device mounted in a vehicle and a fuel efficiency information management server, wherein the fuel efficiency information management device is configured to measure the fuel efficiency and the travel state factor serving as the variation factor of the fuel efficiency for the vehicle in the predefined period and transmit the measurement result to the fuel efficiency information management server.

To attain an object described above, a fuel efficiency information management method of the present invention comprises steps of: recognizing a fuel efficiency and a travel state factor serving as a variation factor of the fuel efficiency in a predefined period for each of a plurality of vehicles; and displaying an eco-information of each vehicle containing a ranking corresponding to the level of the fuel efficiency and the travel state factor via a predefined terminal device.

According to the fuel efficiency information management server, the fuel efficiency information management system and the fuel efficiency information management method of the present invention, a driver of each vehicle or a third party can be informed of a ranking corresponding to the level of the fuel efficiency of each vehicle, together with a travel state factor of each vehicle when the fuel efficiency is achieved, through eco-information. Thereby, the cause and effect relationship between the level of the fuel efficiency of each vehicle and the travel state thereof can be recognized by the driver of each vehicle, and consequently, the utility value of the eco-information relating to the fuel efficiency of the vehicle can be improved.

In the fuel efficiency information management server or the fuel efficiency information management system of the present invention, it is acceptable that the first support calculation processing element is configured to calculate the fuel efficiency on assumption that a specified travel state factor in the actual travel state factors of the vehicle is altered to a different one, and the second support calculation processing element is configured to distribute the eco-information containing a new ranking corresponding to the level of the fuel efficiency calculated by the first support calculation processing element on the assumption and the specified travel state factor to the predefined terminal device.

In the fuel efficiency information management server or the fuel efficiency information management system of the present invention, it is acceptable that the first support calculation processing element is configured to calculate the fuel efficiency, on the assumption that the vehicular model specified as the specified travel state factor is altered to a different one, of another vehicle having a different vehicular model.

According to the fuel efficiency information management server with the above configuration, it is possible for the driver or the third party to compare the fuel efficiency of a vehicle on the assumption that a part of the travel state factor of the vehicle are altered to different ones with the actual fuel efficiency of the vehicle.

For example, when the vehicular model is altered different from the current vehicle, it is possible for the driver to recognize how the fuel efficiency or the like varies. If the vehicular model assumed to be altered is of a vehicle driven by the driver previously, it is possible for the driver to determine whether or not it is appropriate to replace the previous vehicle from the viewpoint of reducing the fuel efficiency. If the vehicular model assumed to be altered is of a new vehicle to buy, it is possible for the driver to surmise whether or not it is appropriate to buy the new vehicle in the future from the viewpoint of reducing the fuel efficiency. Therefore, the utility value of the eco-information relating to the fuel efficiency of the vehicle can be improved.

In the present invention, a component "recognizes" information means that the component performs a possible information processing on a piece of information to prepare the piece of information ready for other information processing, for example, the component receives the piece of information; searches the piece of information in a database or memory or retrieves the piece of information from a database or memory; calculates, estimates, configures, determines, searches the piece of information or the like via arithmetic processing on the basis of the received basic information or the like; visualizes information by decoding packages; and stores in memory or the like the calculated information or the like.

In addition, a component "outputs" information means that the component outputs the information in form of picture, voice output, vibration output and the like, which may be recognized by a human by means of five senses thereof such as eyesight, hearing, touch, etc.

MODE FOR CARRYING OUT THE INVENTION

An embodiment of a fuel efficiency information management system according to the present invention will be described hereinafter.

(Configuration of the Fuel Efficiency Information Management System)

First, the configuration of the fuel efficiency information management system will be described.

Figure 1:
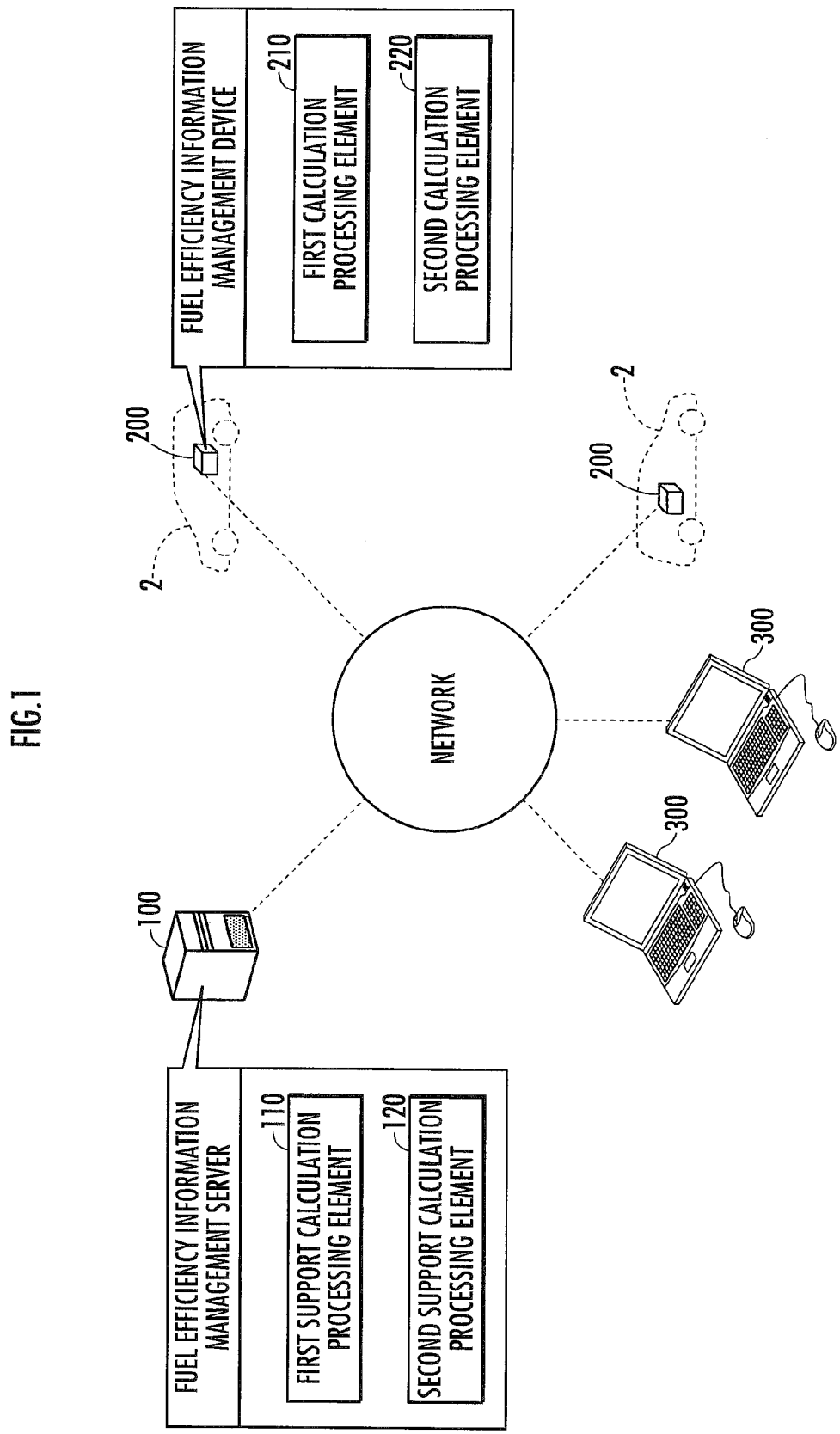
FIG. 1 is a diagram illustrating a fuel efficiency information management system according to the present invention.

The fuel efficiency information management system illustrated in FIG. 1 is composed of a fuel efficiency information management server 100 and a fuel efficiency information management device 200 mounted in a vehicle 2. However, it is acceptable that a part of or the entire part of the fuel efficiency information management device 200 is configured as a portable device removable from the vehicle 2.

The fuel efficiency information management server 100 is comprised of one or a plurality of server computers and is configured to have a communication function with the fuel efficiency information management device 200 and an information processing terminal device 300, respectively, via a network. Any communication network using an internet, a phone-line network or satellite broadcasting or the like may be adopted as the network.

The fuel efficiency information management server 100 is provided with a first support calculation processing element 110 and a second support calculation processing element 120.

The first support calculation processing element 110 is configured to collect travel information from the fuel efficiency information management device 200 mounted in each of the plurality of vehicles 2 via the network. The travel information includes, for example, the fuel efficiency (travel distance per unit fuel) of the vehicle 2 for each day, an eco-index denoting the goodness of fit of the travel state from the viewpoint of reducing the fuel efficiency, a vehicular identification number (vehicular identifier) or a personal identification number (personal identifier). In addition, the measurement frequency of the fuel efficiency or the like for one time is not limited to every day; it may be measured every 12 hours, every 3 days or every week.

The second support calculation processing element 120 is programmed to generate a first eco-information containing a ranking corresponding to the level of the fuel efficiency for each of the plurality of vehicles or the drivers. The second support calculation processing element 120 is also programmed to generate a second eco-information containing a temporal variation of the fuel efficiency and the eco-index of an identical vehicle or a vehicle driven by an identical driver and a travel environmental factor. The second support calculation processing element 120 is configured to transmit the eco-information to a corresponding information processing terminal device 300. The information processing terminal device 300 may be a portable terminal device or a personal computer different from the fuel efficiency information management device 200 or may be the fuel efficiency information management device 200 itself.

The fuel efficiency information management device 200 is provided with a first calculation processing element 210 and a second calculation processing element 220.

The first calculation processing element 210 is configured to measure the fuel efficiency and a travel state factor serving as a variation factor of the fuel efficiency of the vehicle 2 according to output signals or the like from various sensors mounted in the vehicle 2.

The second calculation processing element 220 is programmed to convert the travel state factor of the vehicle 2 in each different period into the eco-index. The second calculation processing element 220 is configured to generate a travel information having the vehicular identification number or the personal identification number combined with the fuel efficiency and the eco-index of the vehicle 2 in each different period and transmit the travel information to the fuel efficiency information management server 100.

When the fuel efficiency information management device 200 is the information processing terminal device 300, it is acceptable that the second calculation processing element 220 is configured to receive the eco-information sent from the fuel efficiency information management server 100 and output the eco-information on an output unit such as a display unit or the like disposed in a central console or the like of the vehicle 2.

(Functions of the Fuel Efficiency Information Management System)

The functions of the fuel efficiency information management system with the above configuration will be described hereinafter.

Figure 2:
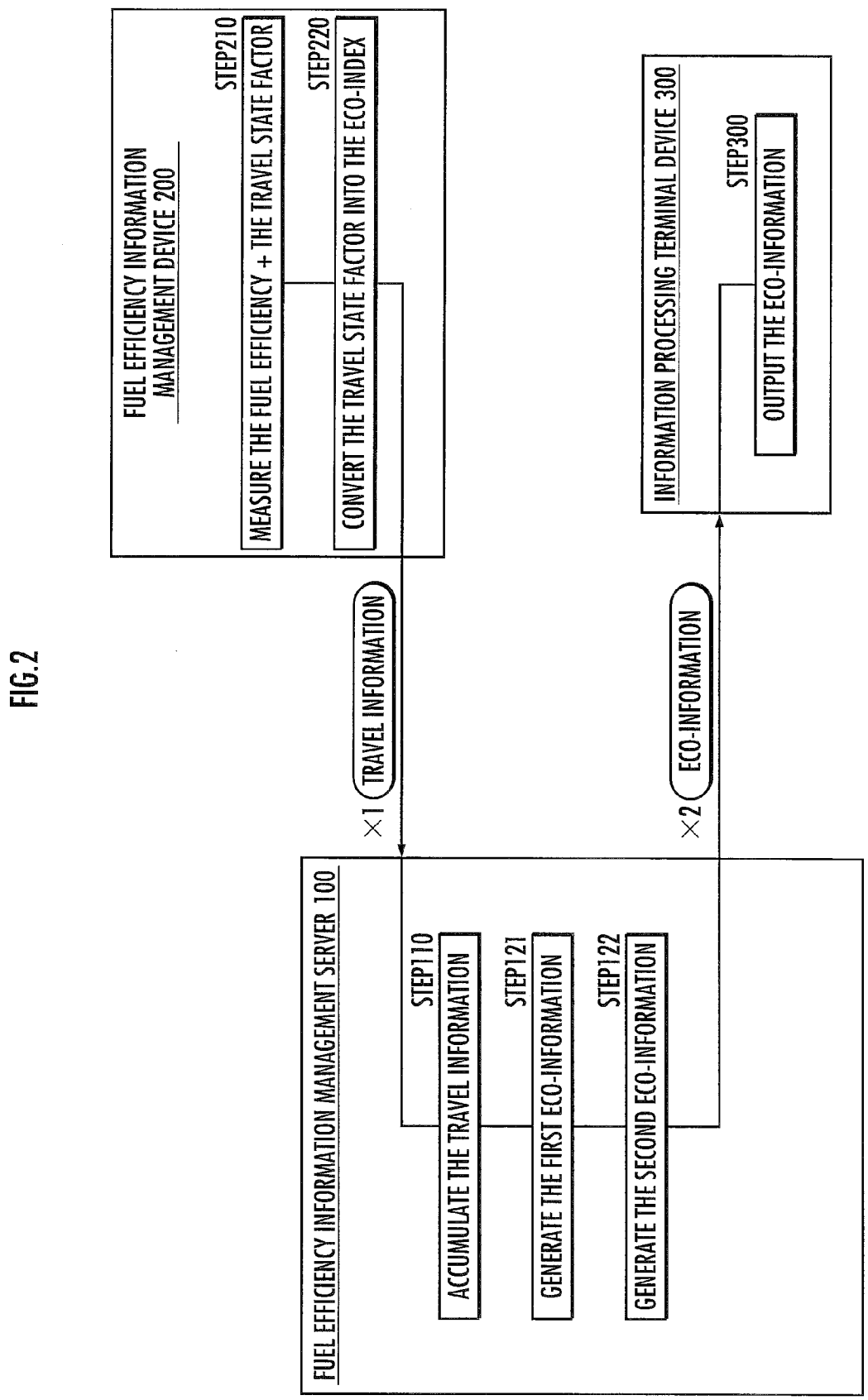
FIG. 2 is a diagram illustrating functions of the fuel efficiency information management system according to the present invention.

In the fuel efficiency information management device 200, the first calculation processing element 210 measures the fuel efficiency and the travel state factor serving as a variation factor of the fuel efficiency for the vehicle 2 according to the output signals or the like from various vehicular sensors such as an accelerator sensor, a brake sensor, an engine revolution velocity sensor and the like mounted in the vehicle 2 (FIG. 2/STEP 210). For example, the variation factors of the fuel efficiency, such as a manipulated amount of an accelerator, a manipulated amount (number of times) of a brake pedal, an idling period, the number of boarding passengers, the working time of an air conditioner and the like, are measured as the travel state factors. An intrinsic factor of the vehicle 2 such as a vehicular model may be recognized as the travel state factor as well. The vehicular model may be identified according to a part of the vehicular identification number, for example.

In one operation period from a time when an IGN switch or ACC switch is switched from OFF to ON to another time when the IGN switch or ACC switch is switched from ON to OFF, the fuel efficiency and the travel state factors measured continuously or accumulatively are stored in a memory device of the vehicle 2 as the measurement result in the period. The operation starting time (switching ON time), the operation ending time (switching OFF time), or an operation time slot may be measured as one of the travel state factors.

However, if the one operation period covers the date line (0:00), it is acceptable that the measurement result of the fuel efficiency and the travel state factors across the operation period are collectively stored in the memory device as the measurement result of the previous day or the current day. In this case, it is also acceptable that the measurement result of the fuel efficiency and the travel state factors before the date line and the measurement result thereof after the date line are stored in the memory device as the measurement result of the previous day and the measurement result of the current day, respectively.

In the fuel efficiency information management device 200, the second calculation processing element 220 converts the travel state factors of the vehicle 2 in each of the different periods as the eco-index (FIG. 2/STEP 220). It is acceptable that a single general eco-index is calculated from a plurality of travel state factors. It is also acceptable that plural eco-indexes are independently calculated from a plurality of travel state factors, respectively. Further, it is acceptable that a single general eco-index is calculated on the basis of the plural eco-indexes.

For example, the smaller the accumulative manipulated amount or the acceleration frequency of the accelerator pedal exceeding an acceleration threshold, the higher the accelerator eco-index will be evaluated. The smaller the number of times of braking or the deceleration frequency of the brake exceeding a deceleration threshold, the higher the brake eco-index will be evaluated. The shorter the idling time is, the higher the idling eco-index will be evaluated. It is acceptable that an average value of the plural eco-indexes is evaluated as the general eco-index. A table, a function or an algorithm for converting the travel state factors into the eco-index is stored in the memory.

Thereafter, the second calculation processing element 220 generates the travel information by combining the vehicular identification number or the personal identification number to the fuel efficiency and the eco-index of the vehicle 2 accumulated in the storing device of the vehicle 2 over several days by the day and transmits the travel information to the fuel efficiency information management server 100 (FIG. 2/arrow X1).

The travel information is transmitted from the fuel efficiency information management device 200 to the fuel efficiency information management server 100 when, for example, the fuel efficiency information management device 200 has been operated by the driver in a predefined mode in the operation period of the vehicle 2, the accumulated amount of the measurement result has reached a predefined information amount, a predefined time has elapsed since the starting of travel of the vehicle 2 or a predefined distance has been traveled.

It is acceptable that the travel information containing the travel state factors of the vehicle 2 in each of the different periods without being converted is transmitted from the fuel efficiency information management device 200 to the fuel efficiency information management server 100 and the travel state factors are converted into the eco-index in the fuel efficiency information management server 100. The travel state factors or the eco-index based on the travel state factors may be included in the travel information with exception according to the willing of the driver of the vehicle 2 or according to the specification of the fuel efficiency information management device 200.

In the fuel efficiency information management server 100, the first support calculation processing element 110 collects the travel information from the fuel efficiency information management device 200 mounted in each of the plurality of vehicles 2 via the network and stores the collected travel information in a data base (FIG. 2/STEP 110).

The second support calculation processing element 120, on the basis of the travel information stored in the data base, generates the first eco-information containing a ranking corresponding to the level of the fuel efficiency for each of the plurality of vehicles or the drivers (FIG. 2/STEP 121). The second support calculation processing element 120, on the basis of the travel information stored in the data base, generates the second eco-information containing a temporal variation of the fuel efficiency and the eco-index of an identical vehicle or a vehicle driven by an identical driver and a travel state factor (FIG. 2/STEP 122).

Thereafter, the second support calculation processing element 120 transmits the eco-information to a corresponding information processing terminal device 300 (FIG. 2/Arrow X2). After the eco-information has been provided to be received by a plurality of unspecific information processing terminal devices 300, it is acceptable that the eco-information is stored only in the corresponding information processing terminal device 300 and deleted from the other information processing terminal devices 300. After receiving the eco-information, the information processing terminal device 300 outputs the eco-information (FIG. 2/STEP 300).

The first eco-information is delivered to the information processing terminal device 300 when, for example, a user namely the driver or the owner of the vehicle 2 mounted with the fuel efficiency information management device 200 logs in a predefined site on the network via the information processing terminal device 300 (FIG. 2/Arrow X2). The identifier used in the log-in may be a vehicular identification number, a personal identification number, or a user ID which is tagged with the vehicular identification number or the personal identification number and managed by the fuel efficiency information management server 100.

Figure 3:
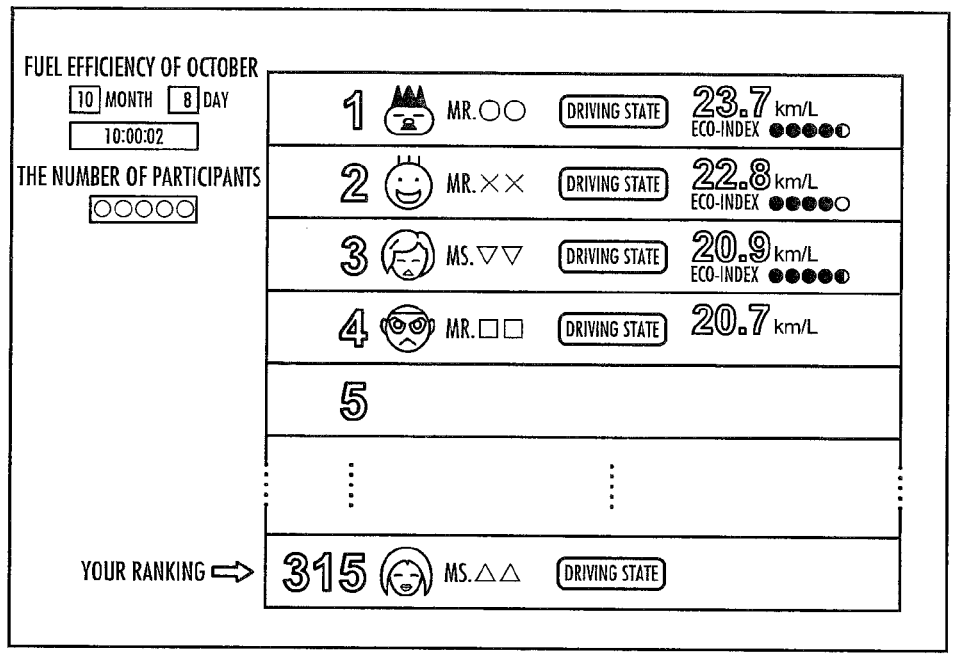
FIG. 3 is an explanatory diagram relating to eco-information.
Figure 3:
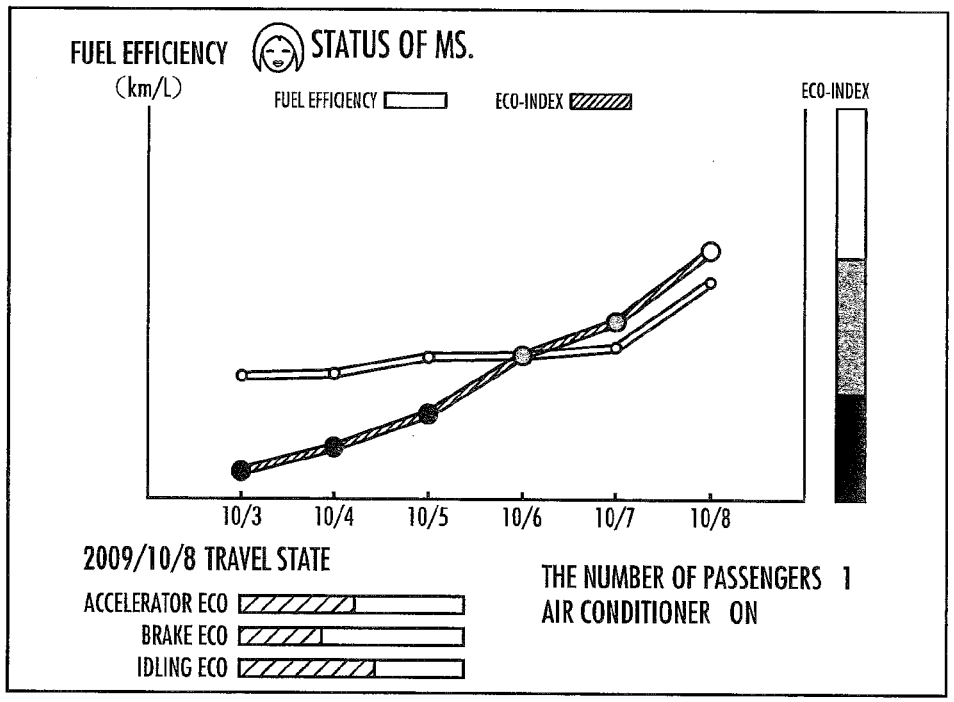

Thereby, the first eco-information illustrated in FIG. 3(*a*), for example, is displayed on a display unit of the information processing terminal device 300. In addition to the ranking corresponding to the level of the fuel efficiency, nicknames of the drivers, the numerical value denoting the fuel efficiency, icons denoting the level of the eco-index and the driving state option Y are listed in the ranking table. If the driving state factor and the eco-index are unrecognizable for a user, the icon and the option are not displayed. Moreover, the ranking of the user who logged in the site is included in the ranking table. It is acceptable that the ranking of a user (himself or herself) is displayed together with the other users of a higher ranking without scrolling the screen or the like.

If the user specifies an arbitrary driver listed in the ranking table by clicking or through similar actions on the driving state option Y, a request is sent from the information processing terminal device 300 to the fuel efficiency information management server 100. In response to the request, the second eco-information relating to the specified driver is transmitted to the information processing terminal device 300 from the fuel efficiency information management server 100 (refer to FIG. 2/Arrow X2).

Thereby, for example, as illustrated in FIG. 3(*b*), in addition to the travel state factors of the vehicle driven by the specified driver, a graph denoting the temporal variation of each of the fuel efficiency and the eco-index is displayed on the display unit of the information processing terminal device 300 as the second eco-information. The second eco-information also includes a diagram or icons denoting the levels of the eco-indexes calculated respectively for different travel state factors such as the accelerator eco-index, the brake eco-index and the idling eco-index.

It is acceptable that the first eco-information and the second eco-information are transmitted to the information processing terminal device 300 as a single whole eco-information and displayed as a whole in one screen.

(Effects of the Fuel Efficiency Information Management System)

According to the fuel efficiency information management system exhibiting the above-mentioned functions, a driver of each vehicle or a third party can be informed of a ranking corresponding to the fuel efficiency level of each vehicle, together with the travel state factor of each vehicle when the fuel efficiency is achieved, through the first eco-information and the second eco-information (refer to FIGS. 3(*a*) and 3(*b*)).

A driver of an identical vehicle or a vehicle driven by the identical driver can be informed of the temporal variation of not only the fuel efficiency but also the eco-index which is a conversion result of the travel state factors serving as the fuel efficiency variation factor when the fuel efficiency is achieved through the second eco-information (refer to FIGS. 3(*a*) and 3(*b*)).

Therefore, the relationship between the variation of the fuel efficiency of a vehicle and the variation of the travel states of the vehicle can be recognized by the driver thereof or a third party. For example, with reference to the driving state of a driver having a higher ranking, each driver can recognize which fact in the accelerator operation frequency, the brake operation frequency and the idling frequency has caused the level difference of the fuel efficiency. Though the fuel efficiency of oneself is low in the whole ranking, it is possible to confirm the temporal variation such as the gradual improvement of the fuel efficiency and the eco-index, the improvement of driving tendency of the self vehicle. Consequently, it is expected to improve the utility value of the eco-information relating to the fuel efficiency of the vehicle.

Another Embodiment of the Present Invention

It is acceptable that the first support calculation processing element 110 is configured to calculate the fuel efficiency or the like on the assumption that a specified travel state factor in the actual travel state factors of the vehicle 2 is altered to a different one and the second support calculation processing element 120 is configured to transmit the eco-information containing the fuel efficiency or the like calculated on the assumption, a ranking corresponding to the fuel efficiency and the specified travel state factor to the information processing terminal device 300.

The specified travel state factor may be preliminarily defined in the fuel efficiency information management server 100, or may be defined according to the willing of a user through operations on the information processing terminal device 300 by the user.

According to the fuel efficiency information management server with the above-mentioned configuration, it is possible for a driver or a third party to compare the actual fuel efficiency or the like of the vehicle 2 with the fuel efficiency or the like on the assumption that a part of the travel state factors of the vehicle 2 are altered to different ones. For example, it is possible for the driver to recognize how the fuel efficiency or the like varies when the vehicular model, which is one of the travel state factors, is altered different from the current vehicle 2.

It is acceptable that the $CO_2$ emission or the gasoline expense per unit period of a vehicle currently owned by a driver and the $CO_2$ emission or the gasoline expense per unit period of a vehicle previously owned by the same driver and driven under the same travel conditions are calculated, and thereafter the second eco-information is generated to include both of the calculation results. The $CO_2$ emission or the gasoline expense may be calculated according to a calculation formula or a calculation table stored in memory or in a storing unit of the fuel efficiency information management server 100 on the basis of the fuel efficiency and the travel state factors of the vehicle 2.

Figure 4:
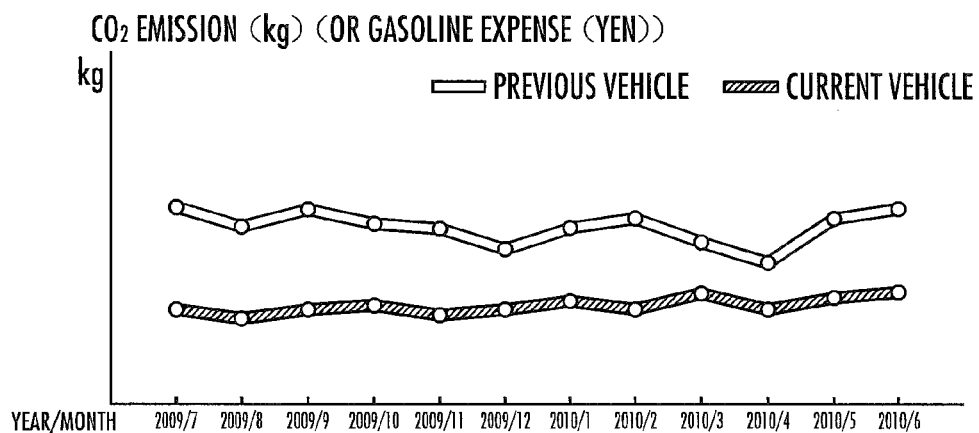
FIG. 4 is an explanatory diagram relating to eco-information.

Specifically, as illustrated in FIG. 4, the second eco-information may be generated to contain the fuel efficiency and the fuel consumption amount over a predefined period (for example, 12 months) for the previously owned vehicle and the currently owned vehicle, respectively, and the comparison result of the $CO_2$ emission or the gasoline expense for the previously owned vehicle and the currently owned vehicle, respectively; and the second eco-information may be displayed on a display unit of the information processing terminal device 300. Moreover, as illustrated by the same FIG. 4, the second eco-information may be generated to contain a graph denoting the temporal variation of the $CO_2$ emission or the gasoline expense every unit time (for example, 1 month) in the predefined period for the previously owned vehicle and the currently owned vehicle, respectively; and the second eco-information may be displayed on a display unit of the information processing terminal device 300.

Thus, if the altered model is of a vehicle owned by the driver previously, it is possible for the driver to determine whether or not it is appropriate to replace the previous vehicle from the viewpoint of reducing the fuel efficiency or the like. For example, as illustrated by the diagram in FIG. 4, it is possible for each driver to recognize to which extent that the $CO_2$ emission or the gasoline expense, together with the fuel efficiency and the fuel consumption amount, of the current vehicle over a predefined period has been improved in comparison with the previous vehicle. If the vehicular model assumed to be altered is of a new vehicle in the market, it is possible for the driver to surmise whether or not it is appropriate to buy the new vehicle in the future from the viewpoint of reducing the fuel efficiency or the like. Therefore, the utility value of the eco-information relating to the fuel efficiency of the vehicle can be improved.

It is acceptable that the fuel efficiency information management server 100 recognizes external factors such as the slope conditions of a road traveled by the vehicle 2, the traffic flow or the presence of traffic jams or the like of a road in the travel period of the vehicle 2, corrects the fuel efficiency or the like, and thereafter generate the eco-information containing the corrected fuel efficiency or the like in addition to or in place of the uncorrected fuel efficiency or the like.

For example, despite that the same distance has been traveled by the vehicle 2, compared with the case when a road has less ups and downs or less curves, the fuel efficiency and the eco-indexes corresponding respectively to the accelerator operated frequency and the brake operated frequency tend to become low in the case when a road has more ups and downs or more curves. In consideration of this point, it is acceptable that the frequency of the ups and downs or the average slope angle of a road traveled by the vehicle 2 is recognized on the basis of a temporal position of the vehicle 2, namely one of the travel state factors, with reference to a map information stored in a data base, and corrects the fuel efficiency or the like to be higher than the actual value as the frequency of the ups and downs becomes higher or the average slope angle becomes greater. The temporal position of the vehicle 2 may be measured by using a GPS device or the like mounted in the vehicle 2.

Moreover, despite that the same distance has been traveled by the vehicle 2, compared with the case when a road has less traffic flow or no traffic jam, the fuel efficiency and the eco-indexes corresponding respectively to the accelerator operated frequency and the brake operated frequency tend to become low in the case when a road has more traffic flow or has traffic jams. In consideration of this point, it is acceptable that the traffic flow or the frequency of occurrence of traffic jams of a road traveled by the vehicle 2 in the travel period of the vehicle 2 is recognized on the basis of the temporal position of the vehicle 2, namely one of the travel state factors, with reference to the road traffic information stored in the data base, and corrects the fuel efficiency or the like higher than the actual value as the traffic flow becomes heavier or the frequency of occurrence of traffic jams becomes greater.

What is claimed is:

1. A fuel efficiency information management method comprising steps of:
   determining, by a processor, a fuel efficiency and a travel state factor serving as a variation factor of the fuel efficiency in a predefined period for each of a plurality of vehicles, the variation factor including at least a vehicular model, a manipulated amount of an accelerator, a manipulated amount of a brake pedal, a frequency of idling, number of boarding passengers, and an active amount of time of an air conditioner;
   storing a map information of a road which includes slop angle or type of up or down, or a road traffic information of a road which includes traffic flow or frequency of occurrence of traffic jams;
   calculating the fuel efficiency when a value or content of a specified travel state factor, which is defined through operations on a predefined terminal device by a user, in a plurality of actual travel state factors is altered to a different value or content;
   determining, by a processor, a frequency of ups and downs or an average slope angle of a road traveled by the vehicle on the basis of a temporal position of the vehicle with reference to the map information stored in the data base;
   correcting the fuel efficiency to be higher than an actual value as the frequency of the ups and downs becomes higher or the average slope becomes greater;
   transmitting an eco-information containing the specified travel state factor and a ranking corresponding to a corrected fuel efficiency to the predefined terminal device; and
   displaying the eco-information of each vehicle containing a ranking corresponding to a level of the fuel efficiency and the travel state factor via the predefined terminal device.

2. A fuel efficiency information management method comprising steps of:
   determining, by a processor, a fuel efficiency and a travel state factor serving as a variation factor of the fuel efficiency in a predefined period for each of a plurality of vehicles;
   storing a map information of a road which includes slope angle or type of up or down, or a road traffic information of a road which includes traffic flow or frequency of occurrence of traffic jams;
   determining, by a processor, traffic flow or frequency of occurrence of traffic jams of a road traveled by the vehicle in a travel period of the vehicle on the basis of a temporal position of the vehicle with reference to the road traffic information stored in the data base;
   correcting the fuel efficiency to be higher than an actual value as the traffic flow becomes heavier or the frequency of occurrence of traffic jams become greater;
   transmitting an eco-information containing the specified travel state factor and a ranking corresponding to a corrected fuel efficiency to a predefined terminal device; and
   displaying the eco-information of each vehicle containing a ranking corresponding to a level of the fuel efficiency and the travel state factor via the predefined terminal device.

3. A fuel efficiency information management server comprising:
   a first support calculation processing element configured to determine a fuel efficiency and a travel state factor serving as a variation factor of the fuel efficiency in a predefined period for each of a plurality of vehicles, the variation factor including at least a vehicular model, a manipulated amount of an accelerator, a manipulated amount of a brake pedal, a frequency of idling, number of boarding passengers and an active amount of time of an air conditioner; and
   a second support calculation processing element configured to transmit an eco-information of each vehicle containing a ranking corresponding to a level of efficiency and the travel state factor recognized by the first support calculation processing element to a predefined terminal device; and
   a data base configured to store a map information of a road which includes slope angle or type of up and down, or a road traffic information of a road which includes traffic flow or frequency of occurrence of traffic jams; wherein:
   the first support calculation processing element is configured to:
      calculate the fuel efficiency when a value or content of a specified travel state factor, which is defined through operations on the predefined terminal device by a user, in a plurality of actual travel state factors is altered to a different value or content,
      determine a frequency of ups and downs or an average slope of a road traveled by the vehicle on the basis of a temporal position of the vehicle with reference to the map information stored in the data base, and
      correct the fuel efficiency to be higher than an actual value as the frequency of the ups and downs becomes higher or the average slope angle becomes greater, or
   the first support calculation processing element is configured to:
      determine traffic flow or frequency of occurrence of traffic jams of a road traveled by the vehicle in a travel period of the vehicle on the basis of a temporal position of the vehicle with reference to the road traffic information in the data base, and
      correct the fuel efficiency to be higher than an actual value as the traffic flow becomes heavier or the frequency of occurrence of traffic jams becomes greater; and
   the second support calculation processing element is figured to:
      transmit the eco-information containing the specified travel state factor and a ranking corresponding to a corrected fuel efficiency to the predefined terminal device.

4. A fuel efficiency information management system comprising a fuel efficiency management device mounted in a vehicle and a fuel efficiency information management server,
wherein the fuel efficiency information management server is provided with
a first support calculation processing element configured to determine a fuel efficiency and a travel state factor serving as a variation factor of the fuel efficiency in a predefined period for each of a plurality of vehicles, the variation factor including at least a vehicular model, a manipulated amount of an accelerator, a manipulated amount of a brake pedal, a frequency of idling, number of boarding passengers and an active amount of time of an air conditioner; and
a second support calculation processing element configured to transmit an eco-information of each vehicle containing a ranking corresponding to a level of efficiency and the travel state factor recognized by the first support calculation processing element to a predefined terminal device,
a data base configured to store a map information of a road which includes slope angle or type of up and down, or a road traffic information of a road which includes traffic flow or frequency of occurrence of traffic jams; wherein:
the first support calculation processing element is configured to:
calculate the fuel efficiency when a value or content of a specified travel state factor, which is defined through operations on the predefined terminal device by a user, in a plurality of actual travel state factors is altered to a different value or content,
determine a frequency of ups and downs or an average slope of a road traveled by the vehicle on the basis of a temporal position of the vehicle with reference to the map information stored in the data base, and
correct the fuel efficiency to be higher than an actual value as the frequency of the ups and downs becomes higher or the average slope angle becomes greater, or
the first support calculation processing element is configured to:
determine traffic flow or frequency of occurrence of traffic jams of a road traveled by the vehicle in a travel period of the vehicle on the basis of a temporal position of the vehicle with reference to the road traffic information in the data base, and
correct the fuel efficiency to be higher than an actual value as the traffic flow becomes heavier or the frequency of occurrence of traffic jams becomes greater; and
the second support calculation processing element is figured to:
transmit the eco-information containing the specified travel state factor and a ranking corresponding to a corrected fuel efficiency to the predefined terminal device,
wherein the fuel efficiency information management device is configured to measure the fuel efficiency and the travel state factor serving as the variation factor of the fuel efficiency for the vehicle in the predefined period and transmit the measurement result to the fuel efficiency information management server.

* * * * *